Sept. 4, 1951 J. MANN 2,566,575
COUPLING
Filed Oct. 18, 1945 3 Sheets-Sheet 1
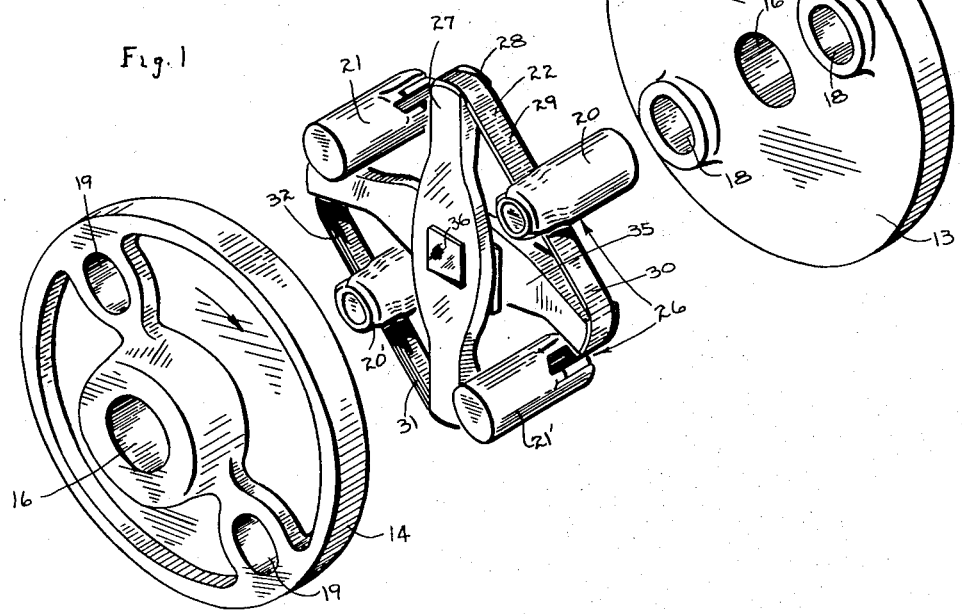
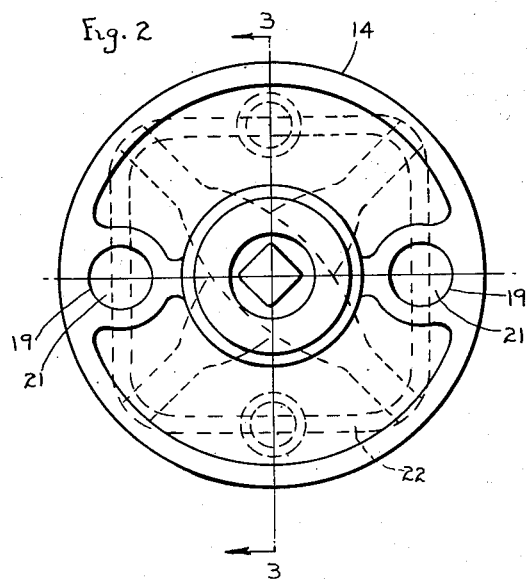
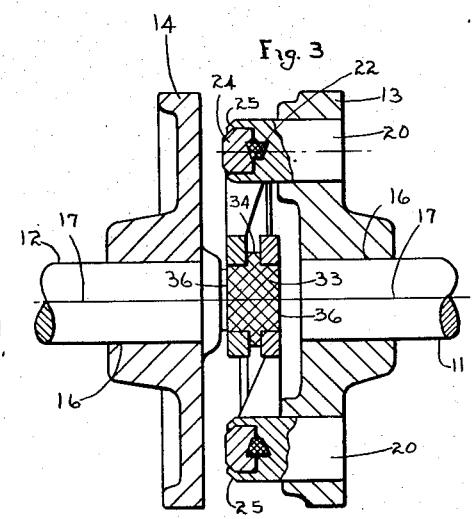
INVENTOR.
John Mann
BY

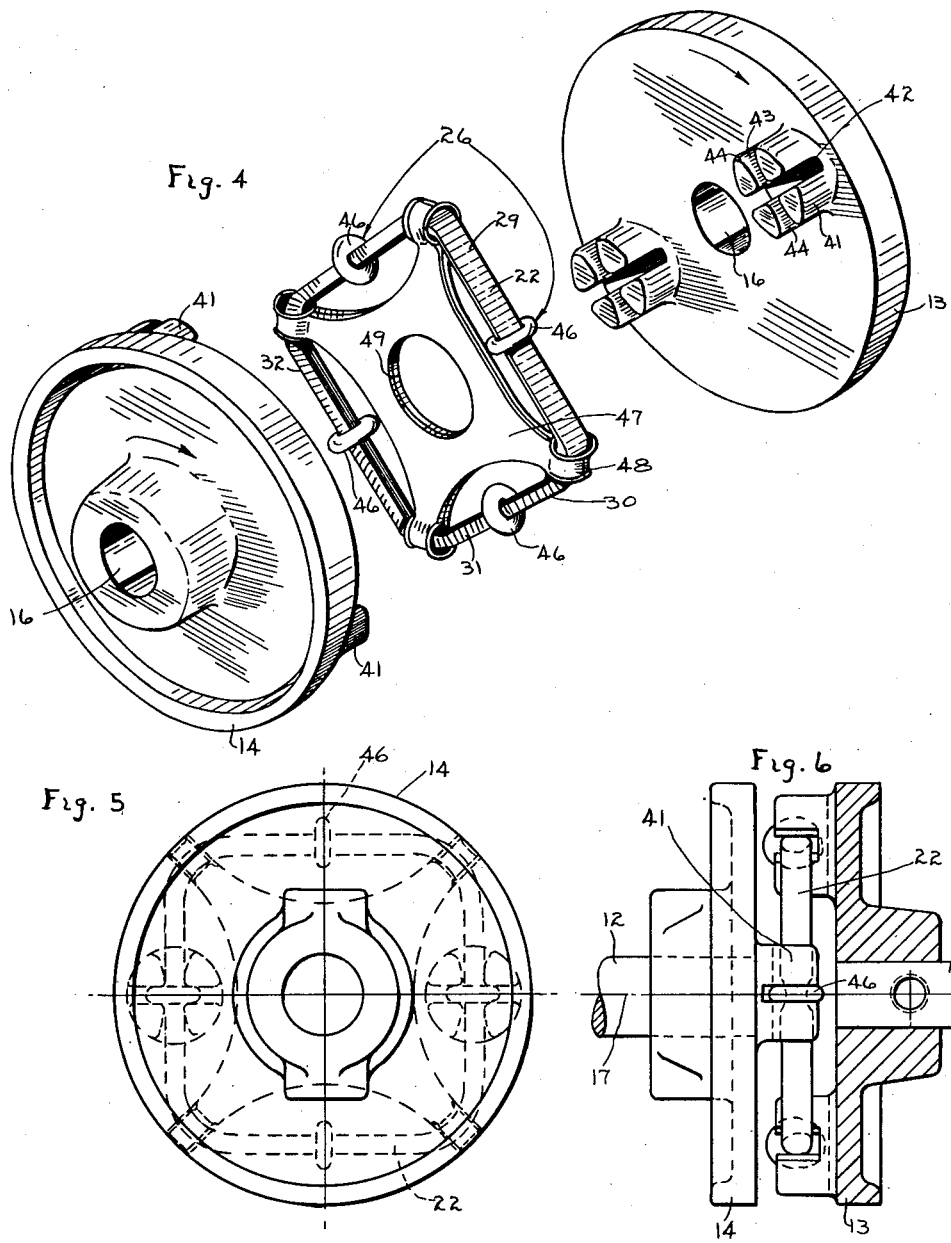

Sept. 4, 1951  J. MANN  2,566,575
COUPLING
Filed Oct. 18, 1945  3 Sheets-Sheet 3

INVENTOR.
John Mann
BY

Patented Sept. 4, 1951

2,566,575

UNITED STATES PATENT OFFICE 2,566,575

COUPLING

John Mann, Seneca Falls, N. Y., assignor to Goulds Pumps, Inc., Seneca Falls, N. Y., a corporation of New York Application October 18, 1945, Serial No. 622,951

3 Claims. (Cl. 64—12)

My invention relates to couplings and more particularly to a device or unit for connecting a driving and driven shaft together in driving relation.

Various types of so-called flexible couplings are offered commercially, some of which are adapted to take care of or compensate for angular misalignment of the driving and driven shafts. Such couplings will operate satisfactorily, when angular misalignment exists, without causing excessive noise and vibration and undue wear on the bearings of the driving motor and the driven part or machine. However, insofar as I am aware, no commercial coupling is available which will take care of or adjust itself to axial misalignment of the driving and driven shafts.

When the shaft of an electric motor or other prime mover is to be connected to the shaft of a driven machine or part the two shafts must be carefully and accurately aligned axially. This is usually done by accurately positioning the motor drive shaft with respect to the driven machine part shaft and requires accurate shimming and adjustment of the motor on its bed plate or other support. Moreover, both the driven machine and the motor, after the driving and driven shafts are in accurate axial alignment, must be securely fastened in position to prevent the shafts from becoming misaligned in operation.

The above procedure not only increases the cost of assembly but also, if it is not accurately done so that slight misalignment remains, results in excessive noise and vibration and undue wear on the bearings particularly of the motor. Should the misalignment be any substantial amount the bearings will be rapidly pounded to pieces.

An object of my invention is to provide a simple, efficient, flexible coupling which is inexpensive to manufacture.

Another object of my invention is to provide a flexible coupling for connecting driving and driven shafts which will take care of or adjust itself to axial misalignment of the driving and driven shafts.

A further object of my invention is to provide a coupling so constructed and arranged that it does not alter or intefere with the load characteristics of the driven shaft or the torque characteristics of the driving shaft regardless of angular or axial misalignment of the shafts within reasonable limits.

My invention further contemplates the provision of a flexible coupling wherein the torque of the driving shaft is transmitted to the driven shaft by means of or through a flexible belt or flexible tie members which are in effect continuous, together with the provision of means for equalizing the load on the several driving elements; maintaining constant torque on the driving half of the coupling; and providing what may be termed a "floating" coupling adapted to take care of or adjust itself to either or both angular or axial misalignment of the shafts.

Other objects and advantages of my invention will be set forth more particularly in the claims and will be apparent from the following description, when taken in connection with the accompanying drawings, in which:

Fig. 1 is a perspective exploded view of the flexible coupling of my invention;

Fig. 2 is a face view of the coupling looking from the left of Fig. 1 with parts of the coupling being shown in dotted lines;

Fig. 3 is a sectional view taken substantially on the line 3—3 of Fig. 2 in the direction indicated by the arrows;

Figs. 4, 5 and 6 are views similar to Figs. 1, 2 and 3 showing a modified form of my invention;

Figure 7:
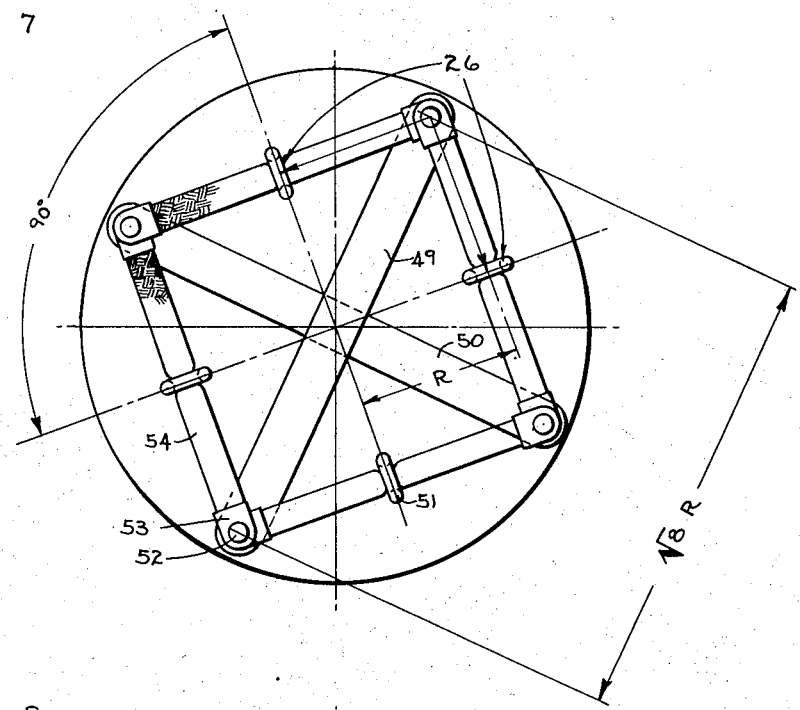
Fig. 7 is a view partially diagrammatic which may be considered still another modified form of my invention and which illustrates how the coupling of my invention may be made.

The flexible coupling of my invention is adapted to be employed in connection with a driving shaft 11 (Fig. 3) and a driven shaft 12. Since the two halves of the coupling are the same, in the preferred form of my invention, it is immaterial which is considered the driving shaft and which the driven shaft. The driving shaft 11 may be connected to any suitable source of power, such as, an electric motor (not shown) and the driven shaft 12 may be connected to any driven part or machine (not shown), as is well known in the art to which this invention applies.

The coupling comprises a pair of coupling halves 13 and 14 which are preferably identical in construction. These coupling halves are each provided with a central bore 16 for the reception of the shafts and are preferably circular so that they are substantially symmetrical with respect to the axes 17 of the shafts. The coupling halves may be fixed against rotation with respect to their respective shafts by keys, set screws, or in any other suitable manner.

As shown in Fig. 1, the coupling halves are provided with bores 18 and 19 for the reception respectively of driving elements 20 and 20' and driven elements 21 and 21'. While I have shown two driving elements and two driven elements, it would be possible to provide more than this number of driving and driven elements. For example, three driving and three driven elements may be provided spaced preferably symmetrically about the axes of their respective shafts. Preferably the bores 18 are spaced symmetrically about the axis of the driving shaft or about the axis of the bore 16. Thus if two driving elements are employed the axes of the bores 18 are spaced equidistant from the axis of the bore 16 and lie in the same plane therewith. Similarly, the axes of the bores 19 on the driven coupling 14 preferably are equally spaced from the axis of the bore 16 and lie in the same plane therewith.

Figure 9:
Fig. 9 is a sectional view of a torque transmitting material suitable for use with the coupling of my invention.

The torque of the driving motor or other prime mover is transmitted to the driven machine or part by means of a flexible belt 22. The belt may be of any suitable type of sufficient strength to transmit the torque or load encountered. I have found extremely suitable for this purpose, as illustrated in Fig. 9, power transmission belts such as are commonly known as V-belt drives. Such belts are usually made by molding rubber about a series of strong cords 23. Although by no means the only material suitable for use, such belts provide sufficient strength and at the same time are sufficiently flexible for the purposes of my invention.

The driving elements 20 and 20' and the driven elements 21 and 21' are securely fastened to the belt. This may be accomplished by providing a slot in the ends of the driving and driven elements for the reception of the belt and then providing each element with a cap 24. The ends of the driving and driven elements may then be peened over, as shown at 25, so as to securely lock the cap in position, apply pressure thereto, and prevent a shifting of the belt with respect to the driving and driven elements.

As shown in the drawings, the driving and driven elements 20 and 20' and 21 and 21' alternate about the approximately common axis of the bores 16 in the driving half of the coupling and the driven half of the coupling. Moreover, the driving and driven elements are secured to the belt or positioned so that a plane through the axes of the driving elements 20 and 20' is normal to a plane through the axes of the driven elements 21 and 21'. In addition, an equal amount of slack is allowed in the belt between adjacent driving and driven elements.

While I have shown the belt as being made in a continuous piece clamped to the driving and driven elements, it is of course obvious that instead it would be possible to provide separate segmental tie members 26 (Figs. 1 and 4) of flexible material clamped to adjacent driving and driven elements. The effect would be the same and would result in a continuous flexible connection between all the driving and driven elements. In the specification and claims where the expression "segmental tie member" is employed, the length or lengths of flexible material between a driving and a driven element is intended, as indicated by the numeral 26 (Figs. 1 and 4).

When axial misalignment exists, the driving and driven elements 20, 20' and 21 and 21' do not rotate in the same circle. They rotate in different circles about axes which are not common to them both. Moreover, the distance between a driving element and a driven element constantly varies during a rotation of the coupling. This, in the conventional commercial coupling, results in fluctuations in the load imposed upon the driving shaft. In fact, with some commercial couplings there is a complete absence of load during a portion of the cycle of rotation and at other portions of the cycle of rotation, the load is suddenly imposed upon the drive shaft with excessive shock. Constant application of the torque of the drive shaft to the driven shaft is impossible. With the coupling of my invention, assuming a constant load and a constant torque prime mover, a substantially constant load is maintained on the drive shaft throughout a cycle of rotation. This is accomplished by means of a strut or compression member 27. The compression member 27 extends across the coupling unit and its ends engage the segmental tie members, the ends of the struts being preferably formed on the arc of a circle and being grooved, as shown at 28, for the reception of the belt. As will presently appear the compression member "floats" between the segmental tie members.

When the drive shaft is driven so as to rotate the coupling in a clockwise direction, as viewed in Fig. 1, the segmental tie member 29 is in tension throughout its length. Similarly, the segmental tie member 31 is in tension throughout its length. If the driving and driven shafts are precisely in alignment theoretically these two tension forces would be equal; the drive shaft would be constantly and uniformly loaded; and the load imposed upon the two driving elements would be equal. Under such conditions the compressive forces exerted on the compression member or strut 27 would be equal and opposite.

Now let us assume the shafts are out of axial alignment and that this misalignment results in increasing the distance between the elements 20 and 21 and decreasing the distance between the elements 20' and 21'. This condition instantaneously results in a shifting of the compression member 27 downwardly, as viewed in Fig. 1. This shifting of the compression member permits the segmental tie member 29 to take a more direct line between the elements 20 and 21 and takes up the slack in the segmental tie member 31. Thus both tie members 29 and 31 are maintained under tension and the load imposed upon the drive shaft is maintained substantially constant assuming the characteristics of the driven machine are such as to cause a constant load.

As the shafts continue to rotate, the distance between the driving and driven elements, for example, the distance between elements 20 and 21, is constantly changing. However, the compression member 27 is constantly responding to the changing conditions and shifting to maintain the segmental tie members under tension and the load on the drive shaft substantially constant. The compression member may be considered to "float" between the segmental tie members to compensate automatically and instantaneously for variations in the distances between the driving and driven elements.

One fact of importance which will be noted is that the unit is assembled with the plane of the axes of the driving elements 20 and 20' normal to the plane of the axes of the driven elements 21 and 21'. The strut or compression member 27 maintains the elements in approximately this perpendicular relationship notwithstanding axial misalignment of the shafts and notwithstanding variations in the distances between them as above described. Moreover, the compression member 27 is placed in compression by the tension forces on the segmental tie members 29 and 31. Should, as under conditions of misalignment, these tension forces be unequal they are equalized across the compression member. Another advantage of the coupling of my invention is that because the loads on diametrical opposite sides of the coupling are balanced no side thrust is exerted on either of the shafts or the bearings supporting them.

For the purpose of enabling the shafts to be rotated in either direction, a second strut or compression member 35 is provided which extends between the segmental tie members 30 and 32 in the same manner as the compression member 27. When the shafts are in alignment, the compression members 27 and 35 are preferably normal to each other. If the shafts are out of axial alignment there is a tendency for the compression members to shift out of their normal perpendicular relationship and this shifting movement constantly occurs during rotation of the coupling unit.

When the shafts are driven so that the coupling rotates in a clockwise direction, as viewed in Fig. 1, the segmental tie members 30 and 32 bear no load and the compression member 35 transmits no forces. However, should the rotation of the shafts be such that the coupling is rotated in a counterclockwise direction, the segmental tie members 29 and 31 and the compression member 27 bear no load and the torque of the drive shaft is transmitted to the segmental tie members 30 and 32 and maintained constant and equalized by the compression member 35. However, if the driven load is not steady and for an interval the driven part has more energy than the driver then, for such interval, the load will be thrown on the idle flexible tie members and compression member.

When two driving elements and two driven elements are employed, and the shafts are in alignment the segmental tie members are of such length as to form an approximate square with the compression members extending along the diagonals of the square and with the driving elements being located at substantially the midpoints of the sides of the square. For the purpose of enabling easy assembly of the parts or removal of the torque transmitting unit, the ends of the driving and driven elements may be loosely fitted in the bores 18 and 19. This "floating" arrangement of the torque transmitting unit with respect to the coupling halves also permits the motor drive shaft to shift axially to "find" its normal rotational position.

I have found it desirable to assist in assembly of the parts and at least to an extent assist in maintaining the normal perpendicular relation of the compression members 27 and 35 to provide a resilient, preferably rubber, core 33 between the compression members. The core 33 has an enlarged portion 34 lying between the compression members and a pair of square ends 36 which lie in square openings formed centrally of the compression members 27 and 35. With this arrangement, any tendency of the compression members to get out of their assembled relationship with respect to the flexible tie members or their desired perpendicular relationship with each other is resisted by the rubber core 33.

In Figs. 4 to 6, inclusive, I have shown a modification of the coupling previously described. In this modification the coupling halves 13 and 14 are each provided with preferably a pair of bosses 41. Each of the bosses has a slot 42 extending substantially radially of the coupling member. Each of the bosses is provided with a second slot 43 extending approximately perpendicular to the slot 42. The slot 43 may have its ends 44 somewhat beveled or curved to allow angular conformance of the belt to the slot and avoid sharp corners likely to cut the belt.

The belt 22 is provided with four clips or ring clamps 46 which are securely fastened to the belt and define four segmental tie members corresponding to the tie members 29, 30, 31 and 32 of the coupling shown in Figs. 1 to 3, inclusive. The clips 46 are adapted to be received in the slots 42 of the coupling bosses to thus form driving connections between the coupling halves through the flexible belt or tie members.

While it is desirable that some play or shifting movement be allowed between the struts or compression members 27 and 35, I have found that this is not entirely necessary. For example, a much less expensive coupling may be made by employing a rigid stamping 47 which has four loops 48, one at each of its corners through which the belt freely passes. In practice it may be desirable to form the stamping by two metal sheets, as shown at 49, which facilitates forming the loops 48.

The operation of the coupling of Figs. 4 to 6, inclusive, is essentially the same as that of Figs. 1 to 3, inclusive. The entire driving torque is carried by the belt 22 and the segmental tie members carrying the load are always in tension. The stamping "floats" between the segmental tie members to correct for variations in the distances between driving and driven elements during rotation of the coupling and maintain the load on the driver substantially constant throughout a cycle of rotation. The approximately square stamping 47 is in compression along one diagonal thereof during rotation of the shaft in one direction, assuming misalignment of the shafts. When the direction of rotation is reversed the stamping 47 is in compression along the other diagonal so as to equalize the load on the two driving clips 46 and their two corresponding bosses 41.

Figure 8:
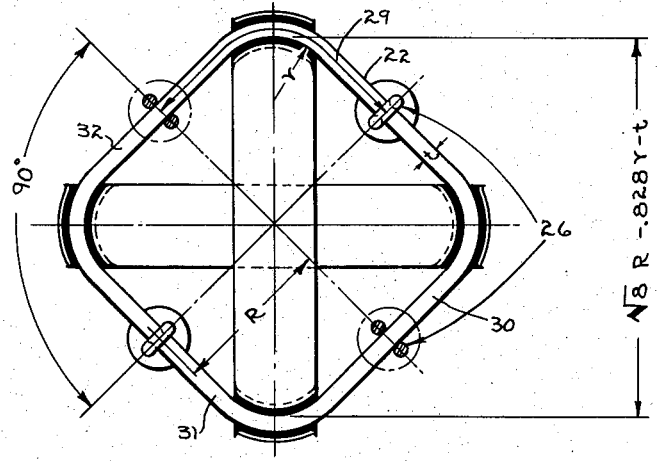
Fig. 8 is a somewhat diagrammatic view which may be taken as illustrative of the couplings of 1 to 3 inclusive and 4 to 6 inclusive showing how the couplings of these modifications may be constructed.

In Fig. 8 I have illustrated, somewhat diagrammatically, a coupling unit which is essentially similar in construction to that shown in Figs. 1 to 3, inclusive. In this arrangement, as in the coupling of Figs. 1 to 3 and the coupling of Figs. 4 to 6, the flexible tie member segments each passes over a radius (r) formed at the end of the strut or compression member. Under such conditions the length of the strut or compression member should be approximately in accordance with the following formula:

Length of strut (approx.) $= R\sqrt{8} - .828\,r - t$

Where:
R is the radius of the coupling, that is, the distance from the axis of the coupling to the center line of the driving element as indicated in Fig. 8
$r$ is the radius of curvature at the ends of the struts or compression members
$t$ is the thickness of the belt.

The flexible coupling unit, shown diagrammatically in Fig. 8, has compression members which are free to shift with respect to each other. When the coupling halves or driving and driven elements are in misalignment and with struts or compression members of the above dimensions, the distance from a driving to a driven element over the end of the compression member is substantially the same for any angular position of the unit during a cycle of rotation. To take care of conditions of misalignment, looseness should be allowed in the flexible tie members so that a flexible tie member is slightly greater in length than the distance between a driving and driven element over the end of the compression member. The actual length which these tie members should be can be calculated for any contemplated misalignment. However, this is not essential to the practical operation of the coupling. In practice sufficient looseness is allowed to take care of the maximum contemplated misalignment. Should the allowed looseness be greater than the misalignment encountered, the extra looseness is taken by a shifting of the driven elements with respect to the driving elements. That is, in operation, a plane through the axes of the driving elements will be slightly out of normal to a plane through the axes of the driven elements. The allowance of this looseness avoids the necessity of stretching the belt to correct for misalignment and maintains the load substantially constant.

When the two struts or compression members are made in one piece, as shown in Figs. 4, 5, and 6, extra looseness should be allowed in the flexible tie member segments to compensate, during rotation, for the lack of angular movement of the struts or compression members with respect to each other.

In Fig. 7 I have shown diagrammatically another modification of the previously described flexible coupling unit. The strut or compression members 49 and 50 are free to shift with respect to each other and the flexible belt is provided with clips 51 corresponding to the clips 46 of Fig. 4. In this arrangement, however, the ends of the struts are provided with pins 52 adapted to receive openings formed in elements 53. The elements 53 are fastened to the ends of lengths 54 of flexible material which may be similar to, or the equivalent of, the belt material above described. Thus in this arrangement the flexible tie member segments which are considered to extend from one clip 51 to the next, are formed in two parts the ends of which are pivoted on the ends of the struts 49 and 50.

In this arrangement the length of the struts or compression members should preferably be, approximately, the square root of $8 \times R$, where R is the radius of the coupling, as shown in Fig. 7. This is essentially the same formula as given above for the length of the compression member of Fig. 8. Since the segmental tie members do not pass over a radius, the r of the formula of Fig. 8 becomes zero. The thickness of the belt is eliminated from the formula because the length of the compression member is considered to be the distance between pivot points 52. Again in this arrangement the lengths of flexible material 54 should be just slightly longer than the distance between the points of attachment of these lengths to the struts or compression members for the purposes above mentioned.

While I have shown and described the preferred forms of my invention, it will be apparent that various modifications and changes may be made therein, particularly in the form and relationship of parts, without departing from the spirit of my invention as set forth in the appended claims.

I claim:

1. A coupling for connecting driving and driven elements rigidly secured respectively to a driving and driven shaft comprising, in combination, tie members forming in effect a continuous flexible belt, a pair of annular members rigidly clipped around said belt and constituting driving elements, a pair of annular members rigidly clipped around said belt and constituting driven elements with the driving and driven elements alternating along the length of the belt, means for maintaining the driving load on the driving elements substantially equal when the drive shafts are out of axial alignment, and means for loosely connecting the driving and driven elements on the shaft with the driving and driven elements on the flexible belt to enable the coupling to be quickly disconnected from the shafts and removed therefrom as an assembled unit.

2. A coupling for connecting driving and driven elements rigidly secured respectively to a driving and driven shaft comprising, in combination, tie members forming in effect a continuous flexible belt, a pair of annular members rigidly clipped around said belt and constituting driving elements, a pair of annular members rigidly clipped around said belt and constituting driven elements with the driving and driven elements alternating along the length of the belt, means extending across the belt and normally in compression for maintaining the driving load on the driving elements substantially equal when the drive shafts are out of axial alignment, and means for loosely connecting the driving and driven elements on the shaft with the driving and driven elements on the flexible belt to enable the coupling to be quickly disconnected from the shafts and removed therefrom as an assembled unit.

3. A coupling for connecting driving and driven elements rigidly secured respectively to a driving and driven shaft comprising, in combination, tie members forming in effect a continuous flexible belt, a pair of annular members rigidly clipped around said belt and constituting driving elements, a pair of annular members rigidly clipped around said belt and constituting driven elements with the driving and driven elements alternating along the length of the belt, means extending across the belt and normally in compression for maintaining the driving load on the driving elements substantially equal when the drive shafts are out of axial alignment, and means including slotted elements on the driving and driven elements for loosely connecting the driving and driven elements on the shaft with the driving and driven elements on the flexible belt to enable the coupling to be quickly disconnected from the shafts and removed therefrom as an assembled unit.

JOHN MANN.

REFERENCES CITED

The following references are of record in the file of this patent:

UNITED STATES PATENTS

| Number | Name | Date |
| --- | --- | --- |
| 1,096,162 | Fawcus | May 12, 1914 |
| 1,672,398 | Treschow | June 5, 1928 |

FOREIGN PATENTS

| Number | Country | Date |
| --- | --- | --- |
| 235,396 | Great Britain | 1925 |